(12) United States Patent
Bigiavi et al.

(10) Patent No.: US 8,202,611 B2
(45) Date of Patent: Jun. 19, 2012

(54) PROCESS COMPOSITIONS AND PERMEABLE FILMS THEREFROM

(75) Inventors: Daniele Bigiavi, Bologna (IT); Giampaolo Pellegatti, Baura (IT); Stefano Spataro, Ferrara (IT)

(73) Assignee: Basell Poliolefine Italia, s.r.l., Milan (IT)

( * ) Notice: Subject to any disclaimer, the term of this patent is extended or adjusted under 35 U.S.C. 154(b) by 916 days.

(21) Appl. No.: 11/793,662

(22) PCT Filed: Dec. 7, 2005

(86) PCT No.: PCT/EP2005/056576
§ 371 (c)(1), (2), (4) Date: Jun. 20, 2007

(87) PCT Pub. No.: WO2006/067043
PCT Pub. Date: Jun. 29, 2006

(65) Prior Publication Data
US 2008/0090061 A1  Apr. 17, 2008

(30) Foreign Application Priority Data

Dec. 21, 2004 (EP) .................................. 04030256

(51) Int. Cl.
B32B 27/32 (2006.01)
C08L 23/12 (2006.01)

(52) U.S. Cl. ....................................... 428/220; 525/240

(58) Field of Classification Search .................. 428/220; 525/240
See application file for complete search history.

(56) References Cited

U.S. PATENT DOCUMENTS

| | | | |
|---|---|---|---|
| 4,298,718 A | 11/1981 | Mayr et al. | |
| 4,399,054 A | 8/1983 | Ferraris et al. | |
| 4,495,338 A | 1/1985 | Mayr et al. | |
| 5,993,922 A * | 11/1999 | Babrowicz et al. | 428/35.7 |
| 6,395,831 B1 | 5/2002 | Pelliconi et al. | |
| 6,410,136 B1 | 6/2002 | DeMeuse | |
| 6,465,574 B1 | 10/2002 | Mulas et al. | |
| 6,485,817 B1 | 11/2002 | DeMeuse | |
| 6,514,625 B1 | 2/2003 | DeMeuse | |
| 6,689,845 B1 | 2/2004 | Govoni et al. | |
| 6,818,583 B1 | 11/2004 | Morini et al. | |
| 2003/0165703 A1 * | 9/2003 | Pelliconi et al. | 428/516 |
| 2005/0107538 A1 | 5/2005 | Pelliconi et al. | |
| 2006/0155071 A1 | 7/2006 | Morini et al. | |
| 2006/0194924 A1 | 8/2006 | Pelliconi | |
| 2007/0010625 A1 | 1/2007 | News et al. | |
| 2007/0093621 A1 | 4/2007 | Meier et al. | |

FOREIGN PATENT DOCUMENTS

| | | |
|---|---|---|
| EP | 373660 | 6/1990 |
| EP | 416379 | 3/1991 |
| EP | 640649 | 3/1995 |
| EP | 674991 | 10/1995 |
| EP | 1012195 | 6/2000 |
| EP | 1428855 | 6/2004 |
| WO | 00/11076 | 3/2000 |
| WO | 00/63261 | 10/2000 |
| WO | 03/031514 | 4/2003 |
| WO | 2004/048424 | 6/2004 |
| WO | WO 2004048424 A1 * | 6/2004 |
| WO | 2004/087805 | 10/2004 |
| WO | 2004/087807 | 10/2004 |
| WO | 2005/019280 | 3/2005 |
| WO | 2006/067052 | 6/2006 |

OTHER PUBLICATIONS

D. Geldart, editor, "High Velocity Fluidized Beds," *Gas Fluidization Technology*, John Wiley & Sons Ltd., p. 155-196 (1986).
J. Randall, "A Review of High Resolution Liquid $^{13}$Carbon Nuclear Magnetic Resonance Characterizations of Ethylene-Based Polymers," *JMS—Rev. Macromol. Chem. Phys.*, C29(2&3), p. 201-317 (1989).
C. Carman et al., "Monomer Sequence Distribution in Ethylene-Propylene Rubber Measured by 13C NMR. 3. Use of Reaction Probability Model," *Macromolecules*, vol. 10(3), p. 536-544 (1977).

* cited by examiner

*Primary Examiner* — David Sample
*Assistant Examiner* — Tahseen N Khan
(74) *Attorney, Agent, or Firm* — Dilworth IP LLC

(57) ABSTRACT

Films especially suitable for the packaging of fresh foodstuff, like salad and vegetables, due to their high permeability to oxygen, carbon dioxide and water vapor, are obtained from polyolefin composition comprising (percentage by weight):
A) 5% to 80% of a butene-1 polymer or polymer composition containing from 0% to 25% of one or more comonomers selected from ethylene and alpha-olefins different from 1-butene, provided that, when ethylene only is present as comonomer, the amount of ethylene is higher than 4% and a copolymer fraction (i) containing at least 6.2% of ethylene is present, said polymer or polymer composition having a content of fraction soluble in xylene at 0° C. of from 50% to 100% and a Flexural Modulus (measured according to ISO 178) from 15 to 300 MPa;
B) 20% to 95% of a propylene homopolymer or copolymer having a content of fraction insoluble in xylene at room temperature of 93% or more.

9 Claims, No Drawings

PROCESS COMPOSITIONS AND PERMEABLE FILMS THEREFROM

This application is the U.S. national phase of International Application Number PCT/EP2005/056576, filed Dec. 7, 2005, claiming priority to European Patent Application 04030256.4 filed Dec. 21, 2004; the disclosures of International Application PCT/EP2005/056576 and European Patent Application 04030256.4, each as filed, are incorporated herein by reference.

The present invention relates to polyolefin compositions and films obtained from the said compositions, especially suitable for the packaging of fresh foodstuff, like salad and vegetables.

It is well known that polypropylene films, and particularly biaxially oriented polypropylene films (BOPP), are widely used for the packaging of foodstuff using automatic machines. In fact the said films are characterized by a particular good balance of processability ("machinability"), optical and mechanical properties, and low permeability to gases, in particular oxygen and carbon dioxide, and water vapour.

However for the packaging of fresh foods, in particular vegetables, greater oxygen, carbon dioxide and water transmission rate is necessary. As a matter of fact, the metabolic activity of vegetable cells continues also after these foods are harvested, cleaned and cut into pieces; therefore the cells still "breathe", consuming the oxygen and emitting carbon dioxide and water vapour. In a closed package this process quickly results in changes of the atmosphere inside the package, making it unsuitable for the continuation of the metabolic activity and favourable for the development of undesired micro-organisms.

Films suitable for packaging fresh produce items that continue to respire after they are harvested are described in U.S. Pat. No. 6,410,136, U.S. Pat. No. 6,485,817 and U.S. Pat. No. 6,514,625. The films therein described are obtained combining ethylene/propylene, butene/propylene copolymers or ethylene/propylene/butene terpolymers, with polypropylene.

From the data in the examples of the said documents it can be seen that the improvement in oxygen transmission rate (OTR) and water vapour transmission rate (WVTR) is obtained at the cost of lowering the tensile modulus of the films.

However it is well known that the machinability of a packaging film is mostly dependent from its tensile stiffness, and this property strongly decreases when decreasing the film thickness.

On the other hand, it is known that the OTR of the films becomes higher as the film thickness is decreased.

There is therefore a continuous effort to achieve packaging films having an improved balance of machinability and permeability to oxygen, carbon dioxide and water vapour.

It has now been found that a particularly good balance of the said properties, associated with very high levels of film transparency (low haze values) is achieved by employing, for the preparation of permeable films, a polyolefin composition comprising (percent by weight):

A) 5% to 80%, preferably 20% to 70%, of a butene-1 polymer or polymer composition containing from 0% to 25%, preferably from 0% to 15%, of one or more comonomers selected from ethylene and alpha-olefins different from 1-butene, provided that, when ethylene only is present as comonomer, the amount of ethylene is higher than 4% and a copolymer fraction (i) containing at least 6.2% of ethylene is present, said polymer or polymer composition having a content of fraction soluble in xylene at 0° C. of from 50% to 100%, preferably from 60% to 100%, and a Flexural Modulus (measured according to ISO 178) from 15 to 300 MPa, preferably from 20 to 150 MPa;

B) 20% to 95%, preferably 30% to 80%, of a propylene homopolymer or copolymer having a content of fraction insoluble in xylene at room temperature of 93% or more, preferably 94% or more, the copolymer containing one or more comonomers selected from ethylene and alpha-olefins different from propylene, in amounts preferably not higher than 3%, more preferably not higher than 2%.

Thus an additional object of the present invention is represented by permeable films for packaging, wherein at least one layer is substantially made of or comprises the above said composition.

As mentioned, the films are characterized by a very high balance of Tensile Strength and Haze (of less than 2%) in addition to the said permeability, and are particularly suited for the packaging of fresh foodstuff, like salad and vegetables.

The comonomers that can be present in component (A) of the composition of the present invention are preferably selected from ethylene, propylene and C5-C8 alpha-olefins, such as for example 1-pentene, 1-hexene, 1-octene, 4-methyl-1-pentene.

The comonomers that can be present in component (B) of the composition of the present invention are preferably selected from ethylene and C4-C8 alpha-olefins, such as for example 1-butene.

Other preferred properties for the compositions of the present invention are:
  amount of copolymer fraction (i): from 30% to 90%, more preferably from 50% to 75% by weight, with respect to the weight of (A);
  amount of ethylene in the copolymer fraction (i): from 6.2% to 20%, more preferably from 6.5% to 20%, in particular from 6.5 to 15% by weight with respect to the weight of (i);
  melt flow rate (MFR according to ASTM D 1238, condition L) of the overall composition, from 0.1 to 20, more preferably from 1 to 5 g/10 min;
  melt flow rate (MFR according to ASTM D 1238, condition E) of the component (A), from 0.1 to 20, more preferably from 0.4 to 5 g/10 min;
  ethylene content (via InfraRed analysis) of the component (A), from 0% wt to 30% wt, more preferably from 0% wt to 10% wt;
  flexural elastic modulus (MEF according to ISO 178) of the component (B), from 1000 MPa to 2500 MPa, more preferably from 1500 to 1800 MPa;
  hardness (Shore A) of the component (A), higher than 20.

The butene-1 polymers (A) of the compositions of the present invention can be prepared by polymerization of the monomers in the presence of a stereospecific catalyst comprising (i) a solid component comprising a Ti compound and an internal electron-donor compound supported on $MgCl_2$; (ii) an alkylaluminum compound and, optionally, (iii) an external electron-donor compound.

Magnesium dichloride in active form is preferably used as a support. It is widely known from the patent literature that magnesium dichloride in active form is particularly suited as a support for Ziegler-Natta catalysts. In particular, U.S. Pat. No. 4,298,718 and U.S. Pat. No. 4,495,338 were the first to describe the use of these compounds in Ziegler-Natta catalysis. It is known from these patents that the magnesium dihalides in active form used as support or co-support in components of catalysts for the polymerization of olefins, are characterized by X-ray spectra in which the most intense diffraction line that appears in the spectrum of the non-active halide is diminished in intensity and is replaced by a halo whose maximum intensity is displaced towards lower angles relative to that of the more intense line.

The preferred titanium compounds used in the catalyst component of the present invention are $TiCl_4$ and $TiCl_3$; furthermore, also Ti-haloalcoholates of formula $Ti(OR)_{n-y}X_y$, where n is the valence of titanium, X is halogen, preferably chlorine, and y is a number between 1 and n, can be used.

The internal electron-donor compound is preferably selected from esters and more preferably from alkyl, cycloalkyl or aryl esters of monocarboxylic acids, for example benzoic acids, or polycarboxylic acids, for example phthalic or succinic acids, the said alkyl, cycloalkyl or aryl groups having from 1 to 18 carbon atoms. Examples of the said electron-donor compounds are diisobutyl phthalate, diethylphtahalate and dihexylphthalate. Generally, the internal electron donor compound is used in molar ratio with respect to the $MgCl_2$ of from 0.01 to 1 preferably from 0.05 to 0.5.

The alkyl-Al compound (II) is preferably chosen among the trialkyl aluminum compounds such as for example triethylaluminum, triisobutylaluminum, tri-n-butylaluminum, tri-n-hexylaluminum, tri-n-octylaluminum. It is also possible to use mixtures of trialkylaluminum compounds with alkylaluminum halides, alkylaluminum hydrides or alkylaluminum sesquichlorides such as $AlEt_2Cl$ and $Al_2Et_3Cl_3$.

The external donors (iii) are preferably selected among silicon compounds of formula $R_a^1 R_b^2 Si(OR^3)_c$, where a and b are integer from 0 to 2, c is an integer from 1 to 3 and the sum (a+b+c) is 4; $R^1$, $R^2$, and $R^3$, are alkyl, cycloalkyl or aryl radicals with 1-18 carbon atoms optionally containing heteroatoms. A particularly preferred group of silicon compounds is that in which a is 0, c is 3, b is 1 and $R^2$ is a branched alkyl or cycloalkyl group, optionally containing heteroatoms, and $R^3$ is methyl. Examples of such preferred silicon compounds are cyclohexyltrimethoxysilane, t-butyltrimethoxysilane and thexyltrimethoxysilane. The use of thexyltrimethoxysilane is particularly preferred.

The electron donor compound (iii) is used in such an amount to give a molar ratio between the organoaluminum compound and said electron donor compound (iii) of from 0.1 to 500, preferably from 1 to 300 and more preferably from 3 to 100.

In order to make the catalyst particularly suitable for the polymerization step, it is possible to pre-polymerize said catalyst in a pre-polymerization step. Said prepolymerization can be carried out in liquid, (slurry or solution) or in the gas-phase, at temperatures generally lower than 100° C., preferably between 20 and 70° C. The pre-polymerization step is carried out with small quantities of monomers for the time which is necessary to obtain the polymer in amounts of between 0.5 and 2000 g per g of solid catalyst component, preferably between 5 and 500 and, more preferably, between 10 and 100 g per g of solid catalyst component.

The polymerization process can be carried out according to known techniques, for example slurry polymerization using as diluent a liquid inert hydrocarbon, or solution polymerization using for example the liquid butene-1 as a reaction medium. Moreover, it may also be possible to carry out the polymerization process in the gas-phase, operating in one or more fluidized or mechanically agitated bed reactors. The polymerization carried out in the liquid butene-1 as a reaction medium is highly preferred.

A preferred method of preparing a polymer composition (A) containing ethylene only, consists of carrying out the polymerization in at least two sequential stages (as illustrated in the following examples), the copolymer fraction (i) being prepared in one of such stages.

Examples of the said butene-1 polymers and of methods for their preparation are disclosed in WO2004048424.

The propylene polymers (B) of the compositions of the present invention can be prepared by polymerization of the monomers in the presence of a stereospecific catalyst of the same kind as described above for (A), using well known polymerization techniques in liquid phase (solution or liquid monomer) or in gas phase.

The films of the present invention can be mono-layer films, but preferably they are multilayer, and comprise at least one layer composed of or comprising the polyolefin composition of the present invention.

In particular, the films of the present invention can have a Y, X/Y or a X/Y/X structure, wherein Y is the layer composed of or comprising the polyolefin composition of the present invention.

The X layer(s), equal or different, preferably are composed of or comprise polyolefin materials selected from the above described propylene polymers (B) of the compositions of the present invention, or olefin polymers or polymer compositions having heat-seal properties and/or good compatibility with inks (printability).

The said olefin polymers or polymer compositions are preferably selected from copolymers of propylene with one or more comonomers selected from ethylene and C4-C8 alpha-olefins, preferably butene-1, or combinations of said copolymers.

Generally the said comonomers are present in amounts up to 40% by weight.

Particular examples are:
1. random copolymers of propylene with a C4-C8 alpha-olefin, optionally containing from 0.5 to 6% of ethylene, as additional comonomer, the amount of C4-C8 α-olefin being from 7 to 40%, preferably from 7 to 30%, more preferably from 8 to 30%;
2. random copolymers of propylene with ethylene and optionally with a C4-C8 alpha-olefin, containing up to 10% of ethylene and from 1 to 6% of said C4-C8 α-olefin when present;
3. blends of 1. with 2. and/or with propylene homopolymers.

Olefin polymers and compositions falling in the above definitions are disclosed in EP674991, WO0011076 and WO03031514.

All the said layers may also contain the additives that are commonly used for the film manufacturing, and especially for the films used for packaging applications with automatic machines, such as anti-oxydants, process stabilizers, slip agents, antistatic agents, antiblock agents.

Preferably the films of the present invention are at least monoaxially oriented, more preferably they are bioriented films (BOPP).

Independently from the structure of the films, the overall film thickness is preferably from 9 to 100 microns, the thickness of the skin layer(s) X is preferably from 0.5 to 3 microns, and that of the layer(s) Y, typically used as inner layer(s), is from 9.5 to 100 microns.

The said films are produced by using processes well known in the art.

In particular, extrusion processes can be used.

In said extrusion processes the polymer materials to be used for the various layers are molten in different extruders and extruded through a narrow die slit. Subsequent from the exit from the die, the material can be cooled, heated and oriented in several ways or in combination to produce a that stated thin film. Examples of such common to the polymer processing industry are cast, blown, extrusion coating, uniaxially oriented, simultaneously biaxially oriented, and sequential biaxially oriented film processes.

The extruded molten material is pulled away from the slit and cooled before winding-up.

Specific examples of extrusion processes are the blown film and BOPP processes hereinbelow explained.

Blown Film

The molten polymer materials are forced through a circular shaped slit.

The extrudate which is drawn off has the shape of a tube, which is inflated by air to form a tubular bubble. The bubble is cooled and collapsed before winding-up.

BOPP

The molten polymer materials are forced continuously through a narrow slit. The extruded molten material is pulled away from the slit and cooled, then heated again and stretched both in the Machine Direction (MD) and in the Transverse Direction (TD). After the stretching process, the film is cooled and then wound-up.

The following examples are given to illustrate, not to limit, the present invention.

The following analytical methods have been used to determine the properties reported in the present application.

Ethylene Content

Via InfraRed analysis or $^{13}$C-NMR.

$^{13}$C-NMR spectra are performed on a polymer solution (8-12% wt) in dideuterated 1,1,2,2-tetrachloro-ethane at 120° C. The $^{13}$C NMR spectra are acquired on a Bruker DPX-400 spectrometer operating at 100.61 MHz in the Fourier transform mode at 120° C. using a 90° pulse, 15 seconds of delay between pulses and CPD (WALTZ16) to remove $^1$H-$^{13}$C coupling. About 1000 transients are stored in 32K data points using a spectral window of 60 ppm (0-60 ppm).

The ethylene content is obtained from the triad distribution ([E]=[EEE]+[EEB]+[BEB]) which is calculated as:

| | | |
|---|---|---|
| BBB = (C − 2I)/Σ | BBE = B/Σ | EBE = L/Σ |
| BEB = I/Σ | BEE = D/Σ | EEE = (0.25F + 0.5G)/Σ | where Σ=(C−2I)+B+L+I+D+(0.25F+0.5G).

B, C, D, F, G, I, L are the integrals of the peaks in the $^{13}$C NMR spectrum (peak of EEE sequence at 29.9 ppm as reference). The assignment of these peaks are made according to J.C. Randall, Macromol. Chem. Phys., C29, 201 (1989) and are reported in Table A (nomenclature according to C. J. Carman, R. A. Harrington and C. E. Wilkes, Macromolecules, 10, 536 (1977)).

TABLE A

| Area | Chemical Shift | Assignments | Sequence |
|---|---|---|---|
| B | 37.24 | Tβδ | BBE |
| C | 35.20-34.88 | Tββ | BBB |
|   | 34.88-34.49 | Sαγ | BBEB + BEBE |
| D | 34.49-34.00 | Sαδ | EBEE + BBEE |
| F | 30.39 | Sγδ | BEEE |
| G | 29.9 | Sδδ | EEE |
| I | 24.54-24.24 | Sββ | BEB |
| L | 11.22 | Tδδ | EBE |

Melt Flow Rate (MFR$^I$, 230° C., 2.16 kg)
ASTM D 1238, condition L.
Melt Flow Rate (MFR$^{II}$, 190° C., 2.16 kg)
ASTM D 1238, condition E.
Determination of Solubility in Xylene at 0° C. (% by Weight) MTM 151048E 2.5 g of polymer are dissolved in 250 ml of xylene, at 135° C., under agitation. After 20 minutes, the solution is cooled to 0° C. under stirring, and then it is allowed to settle for 30 minutes. The precipitate is filtered with filter paper; the solution is evaporated under a nitrogen current, and the residue dried under vacuum at 140° C. until constant weight. The weight percentage of polymer soluble in xylene at 0° C. is then calculated. The percent by weight of polymer insoluble in xylene at room temperature is considered the isotactic index of the polymer.

Determination of Solubility in Xylene at Room Temperature (% by Weight)

2.5 g of polymer are dissolved in 250 ml of xylene, at 135° C., under agitation. After 20 minutes, the solution is cooled to 25° C. under stirring, and then it is allowed to settle for 30 minutes. The precipitate is filtered with filter paper; the solution is evaporated under a nitrogen current, and the residue dried under vacuum at 80° C. until constant weight. The weight percentage of polymer soluble in xylene at room temperature is then calculated. The percent by weight of polymer insoluble in xylene at room temperature is considered the isotactic index of the polymer. This value corresponds substantially to the isotactic index determined by extraction with boiling n-heptane, which by definition constitutes the isotactic index of polypropylene.

Flexural Modulus (MEF)
Measured according to ISO 178.
Stress at Break and at Yield, and Elongation at Break
Measured according to ASTM-D638 on a 1.9 mm thick plaque obtained by compression molding (at 200° C. with a cooling of 30°/min) of a polymer composition obtained by mixing in a Brabender the relevant polymer sample with 1% 2,6-di-t-butyl-4-methyl phenol (BHT) at 180° C.
Compression Set 25% 22 h 70° C.
Measured according to ASTM D395
Shore A
Measured according to ASTM D2240
Measurements on Films
Oxygen Transmission (OTR)
Measured on a Mocon OX-TRAN 2/21 unit, commercially available from Mocon, Inc., according to ASTM D3985 at 23° C., 0% relative humidity (R$^H$), and 100% O$_2$.
Water Vapor Transmission (WVTR)
Measured on a Mocon PERMATRAN W3/33 unit, commercially available from Mocon, Inc. according to ASTM F1249 at 37.8° C. and 90% relative humidity (R$^H$).
Carbon dioxide transmission (CO$_2$TR)
Measured on a Mocon PERMATRAN C4/40, commercially available from Mocon, Inc. at 23° C., 0% RH, and 100% CO$_2$.

Products Used in the Working Examples

PB-1 (component (A)): butene-1 homopolymer having a content of fraction soluble in xylene at 0° C. of 65% and Flexural Modulus (measured according to ISO 178) of 18.7 MPa, PB-2 (component (A)): butene-1/ethylene copolymer prepared as described hereinafter.

PP (component (B)): PP Homopolymer having fraction insoluble in xylene at room temperature of 95%, a Melt flow rate 2.0 g/10 min (230° C./2.16 Kg), a tensile modulus of 1500 MPa (1 mm/min) according to ISO 527-1, -2; a density of 0.900 g/cm$^3$ ISO 1183; a Melting Temperature of 163° C. according to ISO MTM 15902.

Preparation of the butene-1/ethylene copolymer (PB-2)
Preparation of Solid Catalyst Component Into a 500 ml four-necked round flask, purged with nitrogen, 225 ml of TiCl$_4$ were introduced at 0° C. While stirring, 6.8 g of microspheroidal MgCl$_2$.2.7C$_2$H$_5$OH (prepared as described in Ex. 2 of U.S. Pat. No. 4,399,054 but operating at 3,000 rpm instead of 10,000) were added. The flask was heated to 40° C. and 4.4 mmoles of diisobutylphthalate were thereupon added. The temperature was raised to 100° C. and maintained for two hours, then stirring was discontinued, the solid product was allowed to settle and the supernatant liquid was siphoned off.

200 ml of fresh $TiCl_4$ were added, the mixture was reacted at 120° C. for one hour then the supernatant liquid was siphoned off and the solid obtained was washed six times with anhydrous hexane (6×100 ml) at 60° C. and then dried under vacuum. The catalyst component contained 2.8 wt % of Ti and 12.3 wt % of phthalate.

Sequential Copolymerization

The sequential polymerization was carried out in two liquid-phase stirred reactors connected in series in which liquid butene-1 constituted the liquid medium.

A pre-reacted mixture of $AliBu_3$, and thexyltrimethoxysilane (Al/thexyltrimethoxysilane molar ratio of 50) in anhydrous hexane and of the solid catalyst prepared as reported above ($AliBu_3$/solid catalyst weight ratio of 166) were introduced in nitrogen flow into the first reactor working under the following conditions:

Temperature (° C.): 75° C.
Ethylene/Butene feed ratio=abt. 5%
Hydrogen/Butene feed ratio=abt 1200 ppm vol After 2 hours of polymerization the content of the first reactor was transferred into the second reactor where the polymerization continued under the same conditions with the only difference that the ethylene feed was discontinued. The polymerization was stopped after 70 minutes and the final copolymer was characterized. On the basis of the polymerization activity, about 70% of the total copolymer was produced in the first polymerization step and showed an ethylene content of 10% wt. The remaining 30%, produced in the second reactor, had a calculated ethylene content of 1.0% wt. The ethylene content of the final product is therefore about 7.3%. The results of the characterization carried out on the final copolymer are reported in Table B below.

TABLE B

| Ethylene (total) % wt | $MFR^{II}$ g/10' | MEF MPa | Stress at Break MPa | Elongation at Break % | Stress at Yield MPa | Compression Set 25% 22 h 70° C. % | Shore A |
|---|---|---|---|---|---|---|---|
| 7.3 | 0.4 | 40 | 11.4 | 350 | 0 | 63 | 84 |

EXAMPLES 1 TO 5 AND REFERENCE EXAMPLE 1

Preparation of the Polyolefin Compositions and Films

The polyolefin compositions used in the examples are blends made of the above described PP homo as component (B), and from 20 to 60% wt of the above described PB copolymers as component (A), except for the composition of Reference Example 1, which is made of PP homo only. The blends are made using a Brabender extruder. The composition of the blends is reported in Table C below.

TABLE C

| | Example No. | | | | | |
|---|---|---|---|---|---|---|
| | 1 | 2 | 3 | 4 | 5 | Ref. 1 |
| PB-1 homo | 20 | 40 | | | | |
| PB-2 random | | | 20 | 40 | 60 | |
| PP homo | 80 | 60 | 80 | 60 | 40 | 100 |

Cast films are prepared from the above described blends, using a Collin Cast film apparatus. The cast films are then stretched 6×6 by a TM-Long stretching machine. The resulting monolayer bi-oriented films have a thickness from 22 to 35 μm.

The water vapour, oxygen and carbon dioxide transmission properties of the resulting film are measured using the Mocon instruments and measurement conditions previously reported. The results are listed in Table D below.

TABLE D

| | OTR [cc mil/ (100 in² day)] 23° C.; 0% RH; 100% $O_2$ | WVTR [g mil/ (100 in² day)] 37.8° C.; 90% RH | $CO_2$TR [cc mil/ (100 in² day)] 23° C.; 0% RH; 100% $O_2$ | Thickness μm |
|---|---|---|---|---|
| Example 1 | 242.7 | 0.556 | 805.9 | 27 |
| Example 2 | 448.9 | 0.851 | 1769.9 | 27 |
| Example 3 | 289.5 | 0.650 | 1244.4 | 30 |
| Example 4 | 450.6 | 0.901 | 1325.9 | 22 |
| Example 5 | 1495.2 | 2.023 | 6615.0 | 35 |
| Reference 1 | 131.8 | 0.311 | 2347.5 | 30 |

Note:
RH = Relative Humidity.

The invention claimed is:

1. A polyolefin composition comprising (percentage by weight):
   (A) 5% to 80% of a butene-1 polymer or polymer composition containing from 4% to 25% of ethylene and comprising a copolymer fraction (i) present in an amount from 50% to 75% with respect to the weight of (A), said fraction (i) containing from 6.2% to 15% by weight of ethylene, said polymer or polymer composition having a content of fraction soluble in xylene at 0° C. of from 50% to 100% and a Flexural Modulus (measured according to ISO 178) from 15 to 300 MPa; and
   (B) 20% to 95% of a propylene homopolymer having a content of fraction insoluble in xylene at room temperature of at least 93%, wherein the flexural elastic modulus according to ISO 178 of the component (B) is from 1500 to 2500 MPa.

2. The polyolefin composition of claim 1, further comprising a melt flow rate (MFR according to ASTM D 1238, condition L) of from 0.1 to 20 g/10 min.

3. The polyolefin composition of claim 1, wherein the flexural elastic modulus according to ISO 178 of the component (B) is from 1500 to 1800 MPa.

4. A film for packaging comprising at least a layer, the layer comprising a polyolefin composition comprising (percentage by weight):
   (A) 5% to 80% of a butene-1 polymer or polymer composition containing from 4% to 25% of ethylene and comprising a copolymer fraction (i) present in an amount from 50% to 75% with respect to the weight of (A), said fraction (i) containing from 6.2% to 15% by weight of ethylene, said polymer or polymer composition having a content of fraction soluble in xylene at 0° C. of from 50% to 100% and a Flexural Modulus (measured according to ISO 178) from 15 to 300 MPa; and
   (B) 20% to 95% of a propylene homopolymer having a content of fraction insoluble xylene at room temperature of at least 93%, wherein the flexural elastic modulus according to ISO 178 of the component (B) is from 1500 to 2500 MPa.

5. The film of claim 4, further comprising a thickness of from 9 to 100 microns.

6. The film of claim 4, in the form of a bioriented film.

7. A film comprising an X/Y or an X/Y/X structure, wherein Y is a layer comprising a polyolefin composition comprising (percentage by weight):
   (A) 5% to 80% of a butene-1 polymer or polymer composition containing from 4% to 25% of ethylene and comprising a copolymer fraction (i) present in an amount from 50% to 75% with respect to the weight of (A), said fraction (i) containing from 6.2% to 15% by weight of ethylene is present, said polymer or polymer composition having a content of fraction soluble in xylene at 0° C. of from 50% to 100% and a Flexural. Modulus (measured according to ISO 178) from 15 to 300 MPa; and
   (B) 20% to 95% of a propylene homopolymer having a content of fraction insoluble in xylene at room temperature of at least 93%, wherein the flexural elastic modulus according to ISO 178 of the component (B) is from 1500 to 2500 MPa,
   and the X layer(s), equal or different, comprise polyolefin materials selected from the propylene polymers (B), and olefin polymers or polymer compositions having heat-seal properties and/or ink printability.

8. A process comprising packaging fresh food with a film comprising at least a layer, the layer comprising a polyolefin composition comprising (percentage by weight):
   (A) 5% to 80% of a butene-1 polymer or polymer composition containing from 4% to 25% of ethylene and comprising a copolymer fraction (i) present in an amount from 50% to 75% with respect to the weight of (A), said fraction (i) containing from 6.2% to 15% by weight of ethylene is present, said polymer or polymer composition having a content of fraction soluble in xylene at 0° C. of from 50% to 100% and a Flexural Modulus (measured according to ISO 178) from 15 to 300 MPa; and
   (B) 70% to 95% of a propylene homopolymer having a content of fraction insoluble in xylene at room temperature of at least 93%, wherein the flexural elastic modulus according to ISO 178 of the component (B) is from 1500 to 2500 MPa.

9. A polyolefin composition comprising (percentage by weight):
   (A) 5% to 80% of a butene-1 polymer or polymer composition containing from 4% to 25% of ethylene and comprising a copolymer fraction (i) present in an amount from 50% to 75% with respect to the weight of (A), said fraction (i) containing from 6.2% 15% by weight of ethylene, said polymer or polymer composition having a content of fraction soluble xylene 0° C. of from 50% to 100% and a Flexural Modulus (measured according to ISO 178) from 15 to 300 MPa; and
   (B) 20% to 95% of a propylene homopolymer or copolymer having a content of fraction insoluble in xylene at room temperature of at least 93%, the copolymer containing at least one comonomer selected from ethylene and alpha-olefins different from propylene, wherein the flexural elastic modulus according to ISO 178 of the component (B) is from 1500 to 2500 MPa.

* * * * *